UNITED STATES PATENT OFFICE.

JOSEPH W. PHELAN, OF MEDFORD, AND EDWARD J. WALL, OF CAMBRIDGE, MASSACHUSETTS, ASSIGNORS TO KALMUS, COMSTOCK & WESTCOTT, INC., OF BOSTON, MASSACHUSETTS, A CORPORATION OF MASSACHUSETTS.

METHOD OF REFINING CACAO-OIL.

1,386,527.  Specification of Letters Patent.  Patented Aug. 2, 1921.

No Drawing.  Application filed July 15, 1919. Serial No. 311,055.

*To all whom it may concern:*

Be it known that we, JOSEPH W. PHELAN and EDWARD J. WALL, residing at Medford and Cambridge, respectively, in the county of Middlesex, Commonwealth of Massachusetts, have invented a certain Improved Method of Refining Cacao-Oil; and we do hereby declare the following to be a full, clear, and exact description of the invention, such as will enable others skilled in the art to which it appertains to make and use the same.

The present invention relates to an improved method of refining cacao oil.

In extracting chocolate from the cacao bean after the roasting, crushing and filtering operations, the oil which runs off from the filter press, known as cacao oil or cacao butter, consists of a mixture of glycerids of stearic, palmitic and arachidic acids containing chocolate in suspension and certain volatile substances which give it its characteristic odor and taste. The chocolate in suspension is removed by filtering through paper or cloth in the usual manner, keeping the temperature above the melting point. The removal, however, of the volatile substances, which still confer upon the oil the odor and taste of chocolate, is a matter of difficulty, as it is necessary that the constitution of the oil should remain unchanged, and for the further reason that in preparing the oil for use as a comestible, it is desirable to have it retain its color. One of the uses to which the refined cacao oil is especially adapted is the manufacture of margarin.

The object of this invention is to produce a method of refining cacao oil, and particularly a method by which the odorous and gustable ingredients of the oil may be removed without injury to the constitution of the oil, and without the removal of the color. To this end the invention consists in the method of refining cacao oil hereinafter described and particularly defined in the claims.

The cacao oil, as it comes from the chocolate manufacturers, is first filtered in the usual manner to remove the solid chocolate constituent by filtering it through paper or cloth and keeping the temperature above the melting point.

The gustable and odorous ingredients of the oil are numerous and complicated substances which are present in small percentages, and seem to be nearly all characterized by their volatility. According to the present invention, these substances are removed by exposing the oil in thin layers (preferably in a liquid state) at a temperature near its melting point to a current of gas for a period of time sufficient to remove more or less of the gustable and odorous substances. In one form of apparatus the oil is poured into shallow pans. The layer of oil in the pan is preferably one-half inch in thickness, although it may vary more or less. Greater or lesser thicknesses would increase the cost of practising the process by increasing the length of time required on the one hand or by decreasing the amount of oil treated on the other. These pans are piled and staggered in relation in a chamber and a current of inert gas allowed to flow over the surface of the oil for a sufficient length of time to remove the volatile substances. The gas is preferably a current of air previously conditioned by the removal of dust and deleterious substances. Humidity of the air is not objectionable. The oil is maintained in its liquid state by the current of air, the temperature of which is maintained slightly above the melting point of the oil. It is important that the temperature be maintained as near the melting point as possible, as the tendency to deterioration of the oil is the greater the higher the temperature.

The refining of the oil is accomplished in this manner by the rising of the volatile, gustable and odorous substances to the surface of the oil where they diffuse into the air passing thereover. Obviously this diffusion process requires a considerable length of time in order that all of the gustable and odorous substances be removed from the oil, and it has been found that it requires from 20 to 30 days in order to complete the operation with layers one-half inch in depth and the use of a gentle current of air. It is immaterial to the practice of the invention whether the oil be exposed to the current of air in a state of fixation or whether the oil be in motion. Apparatus in which counter currents of oil and air are maintained is available; for example a column in which the oil trickles down over inert pieces of material, such as glass or quartz, and a current of air flows up therethrough or other contrivance being provided for effecting the exposure of the oil to the air. The temperature of the oil is conveniently maintained by introducing the air at or near the desired temperature.

This process of refining is superior to any chemical processes of refining cacao oil because the latter all involve more or less the decomposition of the oil, accompanied by loss of color, and sometimes also by the production of new and non-pleasing tastes. This process is superior to mechanical processes of refining, because they also in general involve the incidental removal of the color, along with the gustable and odorous substances, which color it is highly desirable to retain, especially where the refined oil is to be used in the manufacture of margarin. This process is further commended by the fact that the oil is not deprived of its color during the process, and this fact, taken in connection with the simplicity of the process and the small amount of power required to carry it on, and its efficiency, make it highly advantageous.

The refined cacao oil is entirely deprived of the characteristic odor and taste of chocolate which it had in its unrefined condition, but it has, of course, the bland, oleaginous odor and taste of an oil. This odor and taste, however, is comparatively faint and tenuous, and is wholly unobjectionable for any uses, and particularly when the oil is used as an ingredient of margarin, as the ingredients which confer the odor and taste of butter are sufficiently vigorous and pervasive to characterize the odor and taste of the product.

This invention is not limited to refining cacao oil, as other oils such as peanut oil may be refined in the same manner.

While the process viewed in its broader aspects may be carried on with the oil in a solid state, it is preferred to practice it with the oil in a liquid state because the elimination of the odorous and gustable ingredients is more rapidly carried on in that state.

Having thus described the invention, what is claimed is:—

1. The method of refining cacao and other similar oils containing volatile, gustable and odorous substances, which consists in exposing it in thin layers to a current of gas under conditions of operation such as to retain its color and to remove some of the gustable and odorous substances.

2. The method of refining cacao and other similar oils containing volatile, gustable and odorous substances which consists in exposing it in thin layers in a liquid state at a temperature near its melting point to a current of gas under conditions of operation such as to retain its color and to remove some of the gustable and odorous substances.

3. The method of refining cacao and other similar oils containing volatile, gustable and odorous substances which consists in exposing it in thin layers in a liquid state at a temperature near its melting point to a current of air for a period of time from twenty to thirty days in length sufficient to remove the gustable and odorous substances.

4. The method of refining cacao and other similar oils containing volatile, gustable and odorous substances which consists in exposing it in thin layers in a liquid state to a current of air having a temperature sufficient to maintain the oil in such state for a period of time from twenty to thirty days in length sufficient to remove the gustable and odorous substances.

JOSEPH W. PHELAN.
EDWARD J. WALL.